US011941000B2

(12) United States Patent
Kwatra et al.

(10) Patent No.: US 11,941,000 B2
(45) Date of Patent: Mar. 26, 2024

(54) COGNITIVE GENERATION OF TAILORED ANALOGIES

(71) Applicant: International Business Machines Corporation, Armonk, NY (US)

(72) Inventors: Shikhar Kwatra, San Jose, CA (US); Robert E. Loredo, North Miami Beach, FL (US); Frederik Frank Flöther, Schlieren (CH); Stefan Ravizza, Wallisellen (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 186 days.

(21) Appl. No.: 17/232,387

(22) Filed: Apr. 16, 2021

(65) Prior Publication Data
US 2022/0335041 A1  Oct. 20, 2022

(51) Int. Cl.
*G06F 16/9535* (2019.01)
*G06F 16/245* (2019.01)
*G06F 16/2457* (2019.01)
*G06F 16/248* (2019.01)
*G06F 16/28* (2019.01)
(Continued)

(52) U.S. Cl.
CPC .......... *G06F 16/245* (2019.01); *G06F 16/248* (2019.01); *G06F 16/285* (2019.01); *G06F 16/5866* (2019.01); *G06F 18/22* (2023.01); *G06F 18/23213* (2023.01);
(Continued)

(58) Field of Classification Search
CPC .... G06F 16/245; G06F 16/248; G06F 16/285; G06F 16/5866; G06F 18/22; G06F 18/23213; G06K 9/6215; G06K 9/6223; G06Q 30/04; G10L 15/26; G06N 3/04;
(Continued)

(56) References Cited

U.S. PATENT DOCUMENTS 6,523,026 B1 * 2/2003 Gillis .................... G06F 16/332
8,640,158 B2   1/2014 Durden et al.
(Continued)

FOREIGN PATENT DOCUMENTS

WO        2020010352 A1    1/2020
WO   WO-2020010352 A1 *  1/2020  ........... G06F 16/316

*Primary Examiner* — Etienne P Leroux
*Assistant Examiner* — Oscar Wehovz
(74) *Attorney, Agent, or Firm* — Garg Law Firm, PLLC; Rakesh Garg; Nicholas Welling

(57) ABSTRACT

An embodiment includes processing a dataset to generate a set of feature vectors that include a first feature vector corresponding to a first concept within a user's areas of interest and a second feature vector corresponding to a second concept within the user's areas of study. The embodiment identifies clusters of the feature vectors and identifies key features that most contribute to influencing the clustering algorithm. The embodiment selects the first feature vector in response to a user query, and then selects the second feature vector based on an overlap between key features of the first and second feature vectors and a degree of dissimilarity between the first and second concepts. The embodiment outputs a query response that includes the second concept. The embodiment also determines an effectiveness value based on sensor data indicative of a user action responsive to the outputting of the response to the query.

20 Claims, 12 Drawing Sheets

(51) Int. Cl.
   *G06F 16/58*      (2019.01)
   *G06F 16/587*     (2019.01)
   *G06F 16/951*     (2019.01)
   *G06F 16/9536*    (2019.01)
   *G06F 18/22*      (2023.01)
   *G06F 18/23213*   (2023.01)
   *G06N 3/04*       (2023.01)
   *G06Q 30/04*      (2012.01)
   *G10L 15/26*      (2006.01)
   *G06F 16/583*     (2019.01)

(52) U.S. Cl.
   CPC .............. *G06Q 30/04* (2013.01); *G10L 15/26* (2013.01); *G06N 3/04* (2013.01)

(58) Field of Classification Search
   CPC .... G06N 3/0464; G06N 3/0475; G06N 3/094; G06N 20/00
   See application file for complete search history.

(56) References Cited

U.S. PATENT DOCUMENTS

| | | | |
|---|---|---|---|
| 8,762,186 B2 | 6/2014 | Freire et al. | |
| 9,053,089 B2 | 6/2015 | Bellegarda | |
| 9,092,802 B1 | 7/2015 | Akella | |
| 9,235,806 B2 | 1/2016 | Sweeney et al. | |
| 9,588,965 B2 | 3/2017 | Pedanekar et al. | |
| 9,892,112 B1 | 2/2018 | Allen et al. | |
| 10,169,703 B2 | 1/2019 | Allen et al. | |
| 10,176,804 B2 | 1/2019 | Jiang et al. | |
| 10,331,718 B2 | 6/2019 | Allen et al. | |
| 10,387,784 B2 | 8/2019 | Majumdar | |
| 10,503,768 B2 | 12/2019 | Allen et al. | |
| 10,817,483 B1* | 10/2020 | Samdani | G06F 16/215 |
| 2006/0149558 A1* | 7/2006 | Kahn | G10L 15/063 704/278 |
| 2013/0086147 A1* | 4/2013 | Kashyap | G06F 9/5083 709/203 |
| 2015/0310096 A1* | 10/2015 | Bao | G06F 16/367 707/738 |
| 2016/0203130 A1 | 7/2016 | Roque et al. | |
| 2016/0379133 A1* | 12/2016 | Shteingart | G06N 20/00 706/12 |
| 2017/0322939 A1* | 11/2017 | Byron | G06N 20/00 |
| 2018/0005116 A1* | 1/2018 | Pickover | G06Q 50/01 |
| 2019/0179862 A1* | 6/2019 | Ho | G06F 16/243 |
| 2019/0340256 A1* | 11/2019 | Kulkarni | G06F 16/24578 |
| 2019/0354883 A1 | 11/2019 | Aravamudan et al. | |
| 2020/0210396 A1* | 7/2020 | Stanton | G06F 16/41 |

* cited by examiner

COGNITIVE GENERATION OF TAILORED ANALOGIES

BACKGROUND

The present invention relates generally to a method, system, and computer program product for cognitive processing. More particularly, the present invention relates to a method, system, and computer program product for cognitive generation of tailored analogies.

Self-study and remote learning are facilitated by the vast amount of information that is readily available via the Internet, the World Wide Web (WWW), and other information sources. Many electronic educational tools exist that provide static educational materials and references or links to websites that provide supplementary material for a topic of study. A user engaging in self-study or independently studying as part of a remote learning program may also utilize various electronic tools such as search engines in locating content on the Internet. A search engine is a computer program that receives a search query from a user (e.g., in the form of a set of keywords) indicative of content desired by the user, and returns information and/or hyperlinks to information based on the user's search query.

SUMMARY

The illustrative embodiments provide for cognitive generation of tailored analogies. An embodiment includes identifying a plurality of data sources, wherein the plurality of data sources include accessible data related to a plurality of topics, wherein the plurality of topics include a first topic selected based on a user interest, and wherein the plurality of topics include a second topic selected based on an area of study for the user. The embodiment also includes processing a dataset from the plurality of data sources using statistical modeling to generate a set of feature vectors corresponding to respective concepts, the set of feature vectors including a first feature vector corresponding to a first concept within the first topic and a second feature vector corresponding to a second concept within the second topic. The embodiment also includes applying a clustering algorithm to the set of feature vectors to identify a set of clusters of feature vectors, wherein the set of clusters includes a first cluster of feature vectors and a second cluster of feature vectors, wherein the first cluster of feature vectors includes the first feature vector and the second cluster of feature vectors includes the second feature vector. The embodiment also includes identifying, from among elements of the feature vectors, elements associated with key features that most contribute to influencing the clustering algorithm when identifying the set of clusters, wherein the key features include a first set of key features from the first feature vector and a second set of key features from the second feature vector. The embodiment also includes selecting, responsive to a query from a user, the first feature vector based on a detected relevance between the first concept and the query. The embodiment also includes selecting the second feature vector based at least in part on an overlap between the first set of key features and the second set of key features and a degree of dissimilarity between the first concept and the second conc. The embodiment also includes outputting a response to the query, wherein the response includes the second concept. The embodiment also includes determining an effectiveness value based at least in part on sensor data indicative of a user action responsive to the outputting of the response to the query. Other embodiments of this aspect include corresponding computer systems, apparatus, and computer programs recorded on one or more computer storage devices, each configured to perform the actions of the embodiment. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
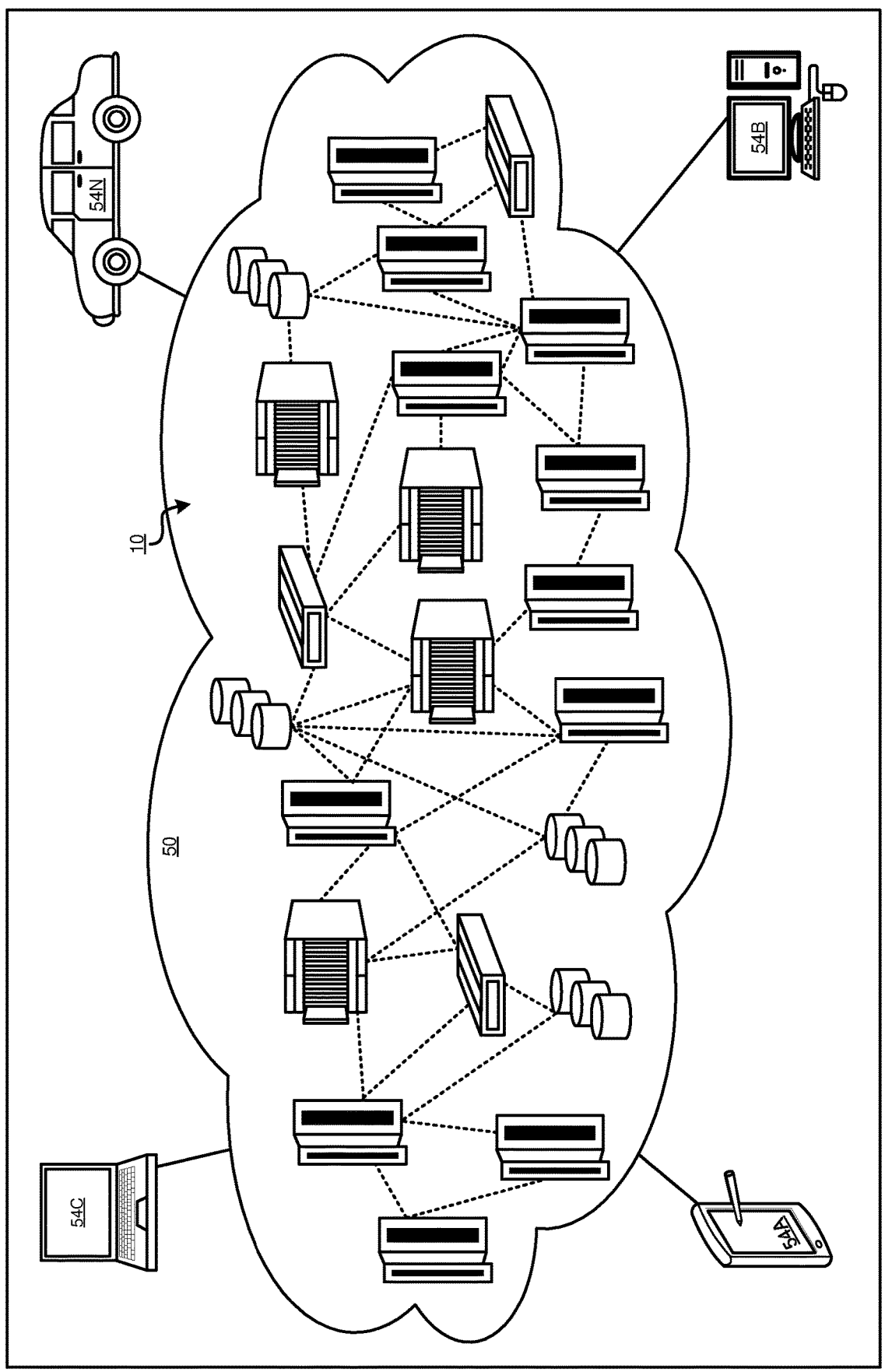
FIG. 1 depicts a cloud computing environment according to an embodiment of the present invention.

While a user engaged in self-study or remote learning may have access to the vast amount of information readily available on the Internet and other sources, it can still be difficult for the user to gain an understanding of new concepts. Existing tools such as search engines and static educational materials provide users with access to information but lack the ability to relate concepts in a topic of study to other concepts that are more familiar to a user.

Analogies and analogizing is a pillar of learning, both in humans and in computation where nearest-neighbor algorithms are a prominent example. Analogies are language constructs that enable people to transfer knowledge from one situation or context to another based on a conceptual similarity. Analogies provide powerful cognitive mechanisms or tools that can be used to explain something that is unknown in terms of a related concept that is known. For instance, medical diagnosis is a field that relies heavily on analogizing. New and complex fields such as quantum computing would benefit from improved analogy methods instead of the usual trial-and-error one-size-fits-all approach. However, existing search engines and educational materials lack the ability to generate and utilize customized analogies that are tailored to a user's background and experience to assist or reinforce a user's understanding of a new concept. As a result, existing search tools and electronic educational materials limit the extent to which users can improve their knowledge through self-study or independent learning.

The illustrated embodiments address these issues by providing for cognitive generation of tailored analogies. In an exemplary embodiment, an analogy recommendation system automatically generates recommended analogies that are specialized to a topic of desired information based on a query associated with a user (e.g., based on a user's query in some embodiments). In some embodiments, the analogy recommendation system automatically obtains or assembles information on one or more topics from various forms of input data, including text, audio, and/or video data. In some embodiments, the analogy recommendation system stores the information as a corpus in a database.

In some embodiments, as a non-limiting example, sources of input data include, but are not limited to, a web page, a website, a blog post, an electronic book, encyclopedia, magazine, journal, manual, paper, or article, a database, and/or digital text data converted from audio, video, or images, or any other suitable form of text. In some embodiments, the analogy recommendation system obtains or assembles the corpus such that the corpus covers a broad array of topics, such as in non-limiting examples, including, but not limited to, health, arts, government, vehicles, science, and any other suitable topics. For example, this can be useful when an analogy recommendation system is employed to provide explanatory analogies for material or concepts presented in digital content, for example digital learning resources, such as e-textbooks, e-books, or digital instructional materials. In another example, an analogy recommendation system obtains or assembles the corpus such that the corpus covers one or more specific topics selected by a user or based on input from a user.

In some embodiments, the analogy recommendation system obtains or assembles the corpus such that the corpus covers topics that are selected based on the user's areas of interest and/or areas of study. In some embodiments, the database stores user information that serves as a source of the user's areas of interests and/or areas of study. In some embodiments, user information includes one or more profiles for the user, such as a personal interests profile and/or a professional interests profile. In some embodiments, user information is collected via a user interface. For example, in some embodiments, the analogy recommendation system generates a profile form that includes one or more form elements (e.g., text fields, radio buttons, list boxes, date pickers, dropdown menus, combo boxes, and/or other elements) and transmits the profile form to the user interface for display to the user. In some embodiments, the user interface obtains user input data based on the user's interaction with the form elements. The analogy recommendation system then generates user information from the user input data. In some embodiments, the user interface includes form elements that allow a user to provide information and authorization sufficient to allow the analogy recommendation system to importing portions of the user information from one or more of the user's social media profiles from one or more third-party servers.

In some embodiments, the analogy recommendation system prepares and presents analogies that relate concepts that are unfamiliar to the user (e.g., concepts in a user's area of study) to other concepts that are familiar to the user (e.g., concepts in the user's area(s) of interest). As a nonlimiting example, in an embodiment a user may indicate in interest in music and may also indicate electronics as an area of current study. In this example, the analogy recommendation system obtains or assembles the corpus such that the corpus includes information related to music and electronics, which will allow the analogy recommendation system to provide the user with analogies that relate new concepts in the area of electronics to more familiar concepts in the area of music (e.g., digital signals are like musical notes played staccato whereas analog signals are like musical notes played legato).

In some embodiments, the analogy recommendation system creates a summary of information topics in the corpus. Non-limiting examples of algorithms and methods for summarization used by various embodiments of the analogy recommendation system include Latent Semantic Analysis, or alternatively the Luhn-Heuristic method, the LexRank algorithm, or the TextRank algorithm. In some embodiments, the analogy recommendation system generates concept embeddings by converting concepts (also referred to herein as corpus terms) from the corpus to high-dimensional vectors (e.g., feature vectors) in a semantic space using any suitable word embedding model, non-limiting examples of which can include, but are not limited to, Word2vec model, GloVe, Long short-term memory (LSTM) learning, convolutional neural network (CNN, or ConvNet) learning, Gated Recurrent Unit (GRU) learning, Deep Learning, Attention Mechanism Deep Learning, Recurrent Neural Network (RNN), neural networks, Principal Component Analysis (PCA), T-Distributed Stochastic Neighbour Embedding (t-SNE) or any other suitable word embedding model. In some embodiments, the analogy recommendation system uses a word embedding technique that includes language modeling and feature learning techniques in natural language processing (NLP) in which corpus terms from the corpus are mapped to vectors of real numbers in a low-dimensional space relative to the size of the corpus. In a non-limiting example, the analogy recommendation system excludes corpus terms that are stopwords when converting corpus terms to vectors. In some embodiments, the analogy recommendation system excludes stopwords that include the most common words in a language (e.g., "a", "the", "is", "at", etc. . . . ), short function words, articles, prepositions, and/or words that lack significance for search queries.

In a non-limiting exemplary embodiment, analogy recommendation system converts corpus term TERM1 from the corpus to a vector (a1, a2, . . . , an), where n is a positive integer representing the number of dimensions of the vector and a1, a2, . . . , an are the numerical values of each dimension of the vector for TERM1. In some embodiments, any suitable number of dimensions are employed for a vector. In some embodiments, analogy recommendation system converts another corpus term TERM2 from the corpus to a vector (b1, b2, ..., bn), where b1, b2, ..., bn are the numerical values of each dimension of the vector for TERM2. In some embodiments, the analogy recommendation system stores information describing vectors of the semantic space as part of the corpus in the database.

In some embodiments, the analogy recommendation system applies a clustering algorithm to determine sets of concepts that form clusters. In some embodiments, the analogy recommendation system uses the k-means algorithm to identify clusters of corpus terms. In some embodiments, the analogy recommendation system computes Euclidean distances between corpus terms to identify clusters, where the distance is indicative of relatedness or closeness to other corpus term in the assigned cluster. In some embodiments, the analogy recommendation system uses a k-medoids clustering, connectivity-based clustering, centroid-based clustering, distribution-based clustering, density-based clustering, fuzzy clustering, biclustering, or any other suitable clustering model.

In some embodiments, the analogy recommendation system determines the "key aspects" that led to a certain concept being grouped into a certain cluster (e.g. the concept "eating a banana" was grouped with other concepts in a cluster "sensory experience" because eating involves the key aspect "tasting"). In some embodiments, the key aspects correspond to key features of a feature vector of a concept (i.e., corpus term). Thus, in some embodiments, key aspects are key features that most contributed to influencing the clustering algorithm when the algorithm grouped the concept in its cluster. In some embodiments, the analogy recommendation system uses a form of explainable artificial intelligence (AI), for example a contrastive explainability technique, to determine the key aspects that led to the cluster selection for each concept. In some embodiments, the contrastive explainability technique involves perturbing the features of a concept feature vector to determine the importance of each of the different features and thereby identify the reasoning behind the cluster selections for each concept.

In some embodiments, the analogy recommendation system operates responsive to an input from a user. For example, in some embodiments, the analogy recommendation system operates responsive to an input from a user device. In some embodiments, the analogy recommendation system operates responsive to a query from the user, where the query identifies a specified concept related to a concept that is unfamiliar to the user or a concept about which the user is seeking additional information. In some such embodiments, a user is using the user device to try to learn something and requests an analogy for a specified concept. The analogy recommendation system identifies one or more analogies based on shared "key aspects" and outputs one or more of the identified analogies to the user device. In an embodiment, as a non-limiting example, a user familiar with music is using the user device to learn about "digital signals" and requests an analogy; in response, the analogy recommendation system suggests an analogy relating "staccato" music to "digital" signals because both concepts ("digital" and "staccato") share the key aspect "discrete."

In some embodiments, the analogy recommendation system selects an analogy based on one or more parameters. For example, in some embodiments, the analogy recommendation system selects an analogy based on parameters that include the accuracy of the analogy, the relevance to the requesting user of the analogy, and the conceptual distance of the concepts included in the analogy.

In some embodiments, the analogy recommendation system calculates the accuracy of the analogy based on an amount of overlap between the "key aspects" of the different concepts in the analogy. In some such embodiments, the analogy recommendation system favors concepts with higher accuracy values over concepts with lower accuracy values.

In some embodiments, relevance to the requesting user is based on feedback received from previously provided analogies for the requesting user. For example, certain concepts may be too complex or unfamiliar for certain users. In some embodiments, the analogy recommendation system favors concepts with higher relevance values over concepts with lower relevance values.

In some embodiments, the conceptual distance of the concepts included in the analogy is based on the Euclidean distance between the clusters in the semantic space used for the clustering algorithm by the analogy recommendation system. In some such embodiments, the analogy recommendation system favors concepts with larger conceptual distances over concepts with lower conceptual distances. In some embodiments, concepts with larger conceptual distances are preferred because an analogy that involves explaining a concept with a very similar one (e.g., "digital" with "encoded") is unlikely to be as useful as an analogy that involves explaining a concept with a dissimilar concept (e.g., "digital" with "staccato"). In some such embodiments, the analogy recommendation system considers the request to be for an analogy for a concept that is in the user's area of study. Therefore, the analogy recommendation system considers the very similar concept to likely be related to the user's area of study, and likewise considers the very dissimilar concept to likely be related to one of the user's areas of interest. In some embodiments, the conceptual distance must be above a certain threshold between the concept associated with the analogy request and another concept selected for use in the suggested analogy.

In some embodiments, the analogy recommendation system determines an effectiveness, or associated effectiveness value, based at least in part on sensor data indicative of a user action responsive to the outputting of the suggested analogy to the user. In various embodiments, the effectiveness of the analogy is determined by tracking aspects of the user's reaction to receiving the analogy, such as the length of time the user spends on the content related to the concept for which the analogy was provided, whether or not the user chooses to request another analogy for the same concept, whether or not the user highlights the analogy or shares the analogy with other users, or feedback from the user in connection with the analogy (e.g., a positive or negative response or rating of the analogy).

In some embodiments, the analogy recommendation system includes a feedback loop to allow the analogy recommendation system to learn and improve analogy selection and creation over time. The feedback may be a simple value or score for a directional analogy pair (having B as an analogy for A is not identical to having A as an analogy for B). In another implementation, reinforcement learning is leveraged to incorporate the feedback where rewards/penalties are applied based on a user's engagement with an analogy. In another implementation, the feedback is also used to enhance the generation of the corpus for a single user or for a plurality of users.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
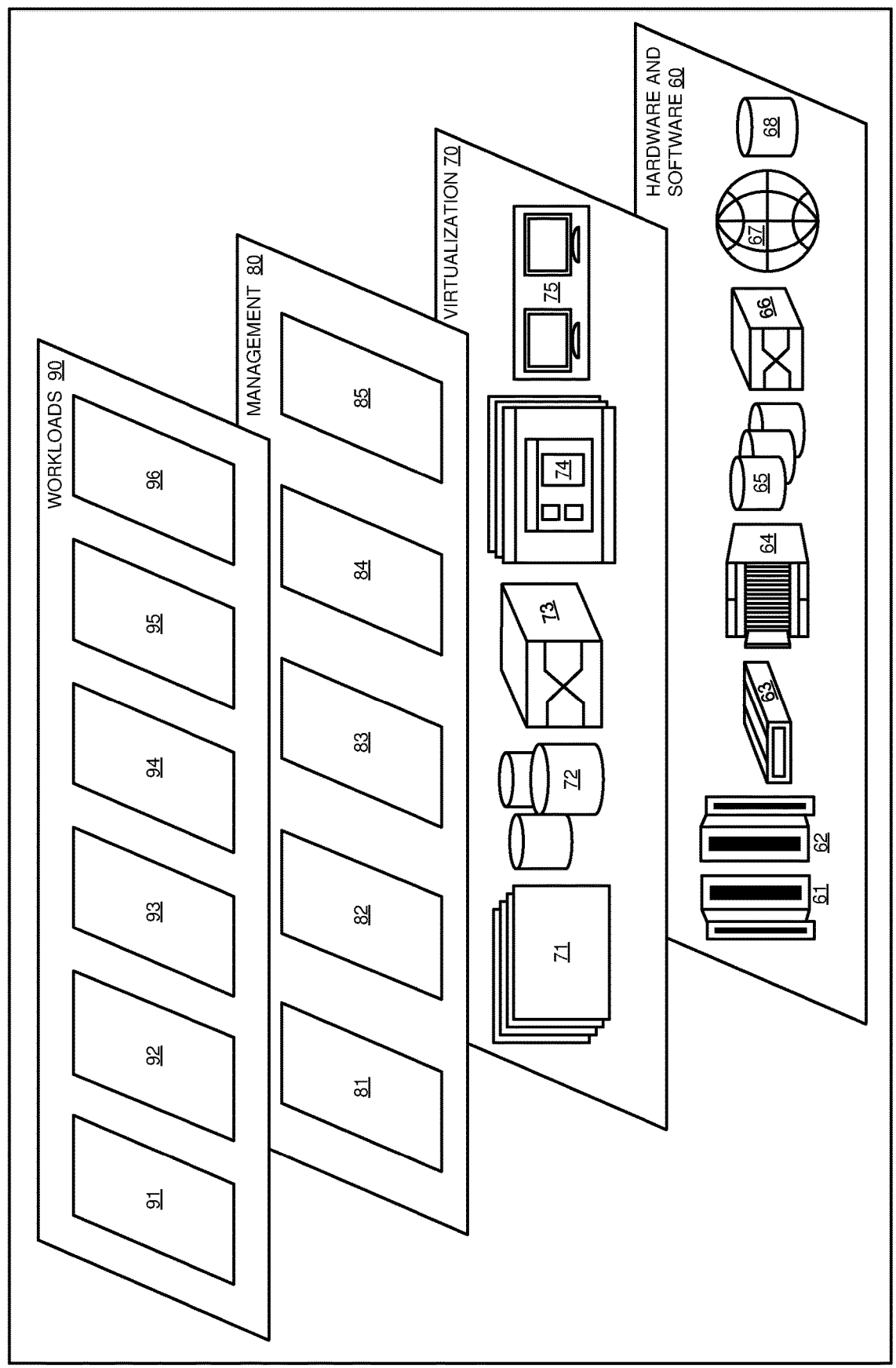
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and analogy recommendation processing 96.

Figure 3:
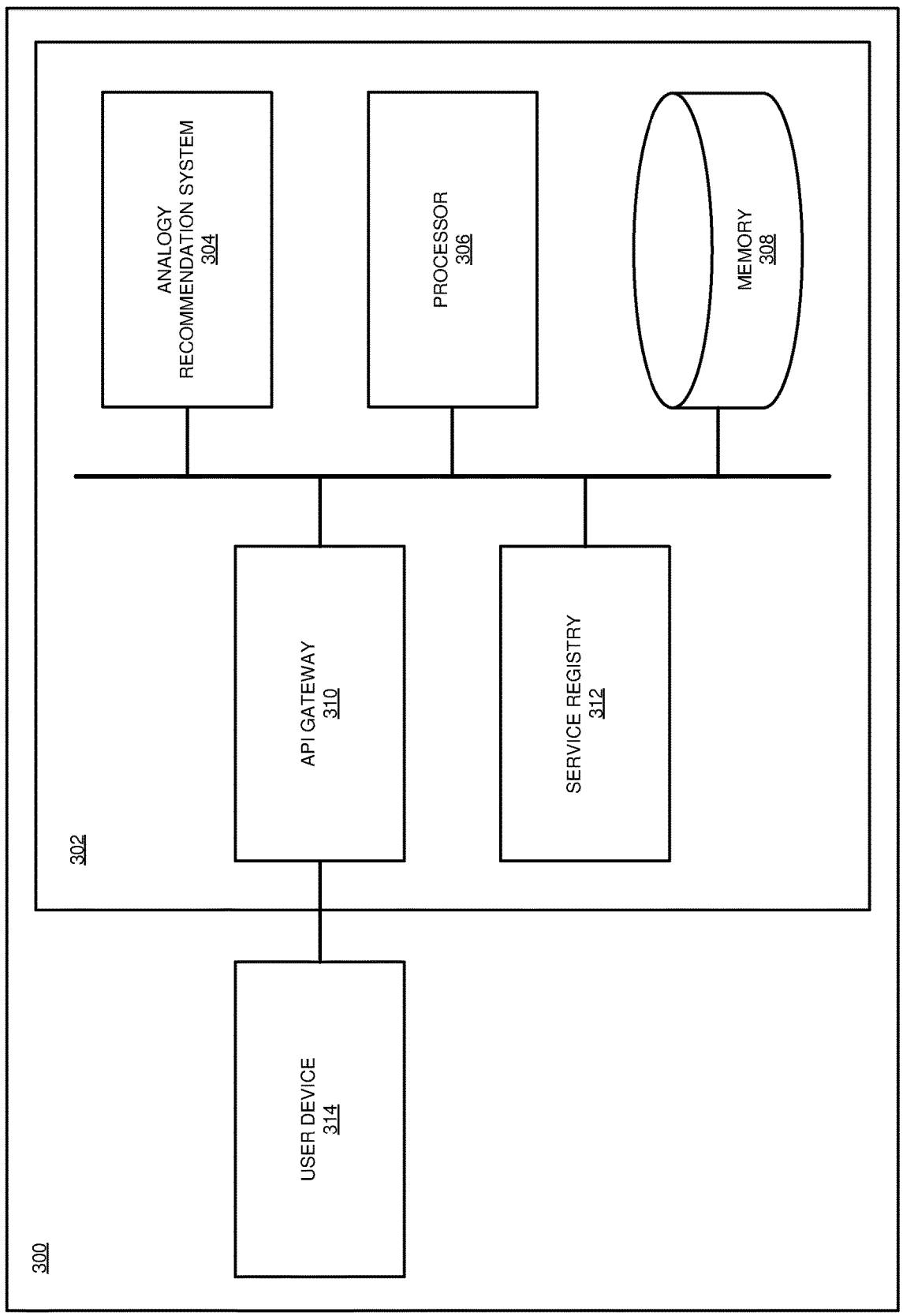
FIG. 3 depicts a block diagram of an example cloud computing environment in accordance with an illustrative embodiment.

With reference to FIG. 3, this figure depicts a block diagram of an example cloud computing environment 300 in accordance with an illustrative embodiment. In the illustrated embodiment, the cloud computing environment 300 includes service infrastructure 302 that provides services and service instances to one or more user devices 314, including analogy recommendation services from an analogy recommendation system 304. In some embodiments, the analogy recommendation system 304 is deployed in workloads layer 90 of FIG. 2. By way of example, in some embodiments, analogy recommendation system 304 provides analogy recommendation processing 96 in FIG. 2.

In the illustrated embodiment, the user device 314 communicates with service infrastructure 302 across one or more networks via an API gateway 310. In some embodiments, the service infrastructure 302 uses a distributed microservice architecture. In some such embodiments, the analogy recommendation system 304 is a microservices-based application that runs as a distributed system across one or more servers. In various embodiments, service infrastructure 302 and its associated analogy recommendation system 304 serve multiple users and multiple tenants. A tenant is a group of users (e.g., a company) who share a common access with specific privileges to the software instance. Service infrastructure 302 ensures that tenant specific data is isolated from other tenants.

In some embodiments, user device 314 connect with API gateway 310 via any suitable network or combination of networks such as the Internet, etc. and use any suitable communication protocols such as Wi-Fi, Bluetooth, etc. Service infrastructure 302 may be built on the basis of cloud computing. API gateway 310 provides access to client applications like analogy recommendation system 304. API gateway 310 receives service requests issued by client applications, and creates service lookup requests based on service requests. As a non-limiting example, in an embodiment, the user device 314 executes a routine to initiate a request to the analogy recommendation system 304 for analogy recommendation processing.

In the illustrated embodiment, the service infrastructure 302 also includes, or is otherwise associated with, at least one memory 308 that includes at least one computer readable storage medium that stores computer readable program instructions (e.g., computer readable program instructions can include, but are not limited to, the analogy recommendation system 304 and associated components), and can store any data generated by analogy recommendation system 304 and associated components. In the illustrated embodiment, the service infrastructure 302 includes, or is otherwise associated with, at least one processor 306 that executes computer readable program instructions stored in memory 308.

In the illustrated embodiment, service infrastructure 302 includes a service registry 312. In some embodiments, service registry 312 looks up service instances of analogy recommendation system 304 in response to a service lookup request such as one from API gateway 310 in response to a service request from user device 314. For example, in some embodiments, the service registry 312 looks up service instances of analogy recommendation system 304 in response to requests related to analogy recommendation processing from the user device 314.

In some embodiments, the service infrastructure 302 includes one or more instances of the analogy recommendation system 304. In some such embodiments, each of the multiple instances of the analogy recommendation system 304 run independently on multiple computing systems. In some such embodiments, analogy recommendation system 304, as well as other service instances of analogy recommendation system 304, are registered in service registry 312.

In some embodiments, service registry 312 maintains information about the status or health of each service instance including performance information associated each of the service instances. For example, as described in more detail herein, such performance information may include various types of performance characteristics of a given service instance (e.g., cache metrics, etc.). As described in more detail herein, extended service registry 312 ranks service instances based on their respective performance characteristics, and selects top-ranking service instances for service discovery or service lookup requests. In the event that a service instance becomes unresponsive or, unhealthy, the service registry will no longer provide its address or information about this service instance to other services.

Figure 4:
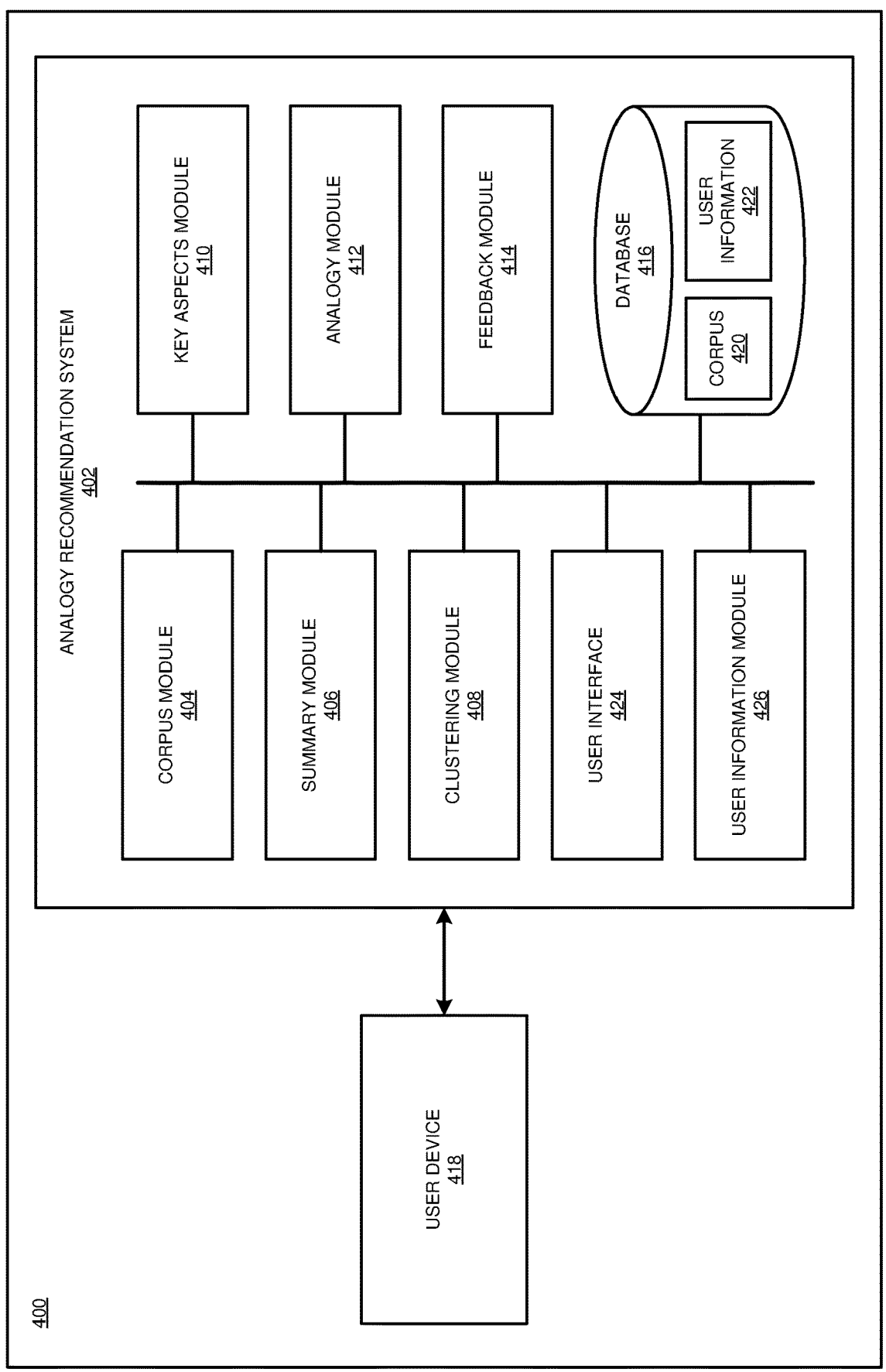
FIG. 4 depicts a block diagram of an analogy recommendation system in accordance with an illustrative embodiment.

With reference to FIG. 4, this figure depicts a block diagram of a computing environment 400 that includes an analogy recommendation system 402 in accordance with an illustrative embodiment. In a particular embodiment, analogy recommendation system 402 is an example of analogy recommendation system 304 of FIG. 3.

In some embodiments, the analogy recommendation system 402 includes a corpus module 404, a summary module 406, a clustering module 408, a key aspects module 410, an analogy module 412, a feedback module 414, a database 416 storing a corpus 420 and user information 422, a user interface 424, and a user information module 426. In alternative embodiments, the analogy recommendation system 402 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the analogy recommendation system 402 automatically generates recommended analogies that are specialized to a topic of desired information based on a query associated with a user (e.g., based on a user's query in some embodiments). In some embodiments, analogy recommendation system 402 includes corpus module 404 that automatically obtains or assembles information on one or more topics from various forms of input data, including text, audio, and/or video data. In the illustrated embodiment, the corpus module 404 stores the information as the corpus 420 in a database 416.

In some embodiments, as a non-limiting example, sources of input data include, but are not limited to, a web page, a website, a blog post, an electronic book, encyclopedia, magazine, journal, manual, paper, or article, a database, and/or digital text data converted from audio, video, or images, or any other suitable form of text. In some embodiments, the corpus module 404 obtains or assembles the corpus 420 such that the corpus 420 covers a broad array of topics, such as in non-limiting examples, including, but not limited to, health, arts, government, vehicles, science, and any other suitable topics. For example, this can be useful when analogy recommendation system 402 is employed to provide explanatory analogies for material or concepts presented in digital content, for example digital learning resources, such as e-textbooks, e-books, or digital instructional materials. In another example, corpus module 404 obtains or assembles the corpus 420 such that the corpus 420 covers one or more specific topics selected by a user or based on input from a user.

In some embodiments, the corpus module 404 obtains or assembles the corpus 420 such that the corpus 420 covers topics that are selected based on the user's areas of interest and/or areas of study. In some embodiments, the database 416 stores user information 422 that serves as a source of the user's areas of interests and/or areas of study. In some embodiments, user information 422 includes one or more profiles for the user, such as a personal interests profile and/or a professional interests profile. In some embodiments, user information 422 is collected via a user interface 424. For example, in some embodiments, the analogy recommendation system 402 includes a user information module 426 that generates a profile form that includes one or more form elements (e.g., text fields, radio buttons, list boxes, date pickers, dropdown menus, combo boxes, and/or other elements) and transmits the profile form to the user interface 424 for display to the user. In some embodiments, the user interface 424 obtains user input data based on the user's interaction with the form elements and provides the user input data to the user information module 426. The user information module 426 then generates user information 422 from the user input data. In some embodiments, the user interface 424 includes form elements that allow a user to provide information and authorization sufficient to allow the user information module 426 to importing portions of the user information 422 from one or more of the user's social media profiles from one or more third-party servers.

In some embodiments, the analogy recommendation system 402 prepares and presents analogies that relate concepts that are unfamiliar to the user (e.g., concepts in a user's area of study) to other concepts that are familiar to the user (e.g., concepts in the user's area(s) of interest in the user information 422). As a nonlimiting example, in an embodiment a user may indicate in interest in music and may also indicate electronics as an area of current study. In this example, the corpus module 404 obtains or assembles the corpus 420 such that the corpus 420 includes information related to music and electronics, which will allow the analogy recommendation system 402 to provide the user with analogies that relate new concepts in the area of electronics to more familiar concepts in the area of music (e.g., digital signals are like musical notes played staccato whereas analog signals are like musical notes played legato).

In the illustrated embodiment, the summary module 406 creates a summary of information topics in the corpus 420. Non-limiting examples of algorithms and methods for summarization used by various embodiments of the summary module 406 include Latent Semantic Analysis, or alternatively the Luhn-Heuristic method, the LexRank algorithm, or the TextRank algorithm. In some embodiments, the summary module 406 generates concept embeddings by converting concepts (also referred to herein as corpus terms) from the corpus 420 to high-dimensional vectors (e.g., feature vectors) in a semantic space using any suitable word embedding model, non-limiting examples of which can include, but are not limited to, Word2vec model, GloVe, Long short-term memory (LSTM) learning, convolutional neural network (CNN, or ConvNet) learning, Gated Recurrent Unit (GRU) learning, Deep Learning, Attention Mechanism Deep Learning, Recurrent Neural Network (RNN), neural networks, Principal Component Analysis (PCA), T-Distributed Stochastic Neighbour Embedding (t-SNE) or any other suitable word embedding model. In some embodiments, the summary module 406 uses a word embedding technique that includes language modeling and feature learning techniques in natural language processing (NLP) in which corpus terms from the corpus 420 are mapped to vectors of real numbers in a low-dimensional space relative to the size of the corpus 420. In a non-limiting example, the summary module 406 excludes corpus terms that are stopwords when converting corpus terms to vectors. In some embodiments, the summary module 406 excludes stopwords that include the most common words in a language (e.g., "a", "the", "is", "at", etc . . . ), short function words, articles, prepositions, and/or words that lack significance for search queries.

In a non-limiting exemplary embodiment, summary module 406 converts corpus term TERM1 from the corpus 420 to a vector (a1, a2, . . . , an), where n is a positive integer representing the number of dimensions of the vector and a1, a2, . . . , an are the numerical values of each dimension of the vector for TERM1. In some embodiments, any suitable number of dimensions are employed for a vector. In some embodiments, summary module 406 converts another corpus term TERM2 from the corpus 420 to a vector (b1, b2, . . . , bn), where b1, b2, . . . , bn are the numerical values of each dimension of the vector for TERM2. In some embodiments, the clustering module 408 stores information describing vectors of the semantic space as part of the corpus 420 in the database 416.

In the illustrated embodiment, the clustering module 408 applies a clustering algorithm to determine sets of concepts that form clusters. In some embodiments, the clustering module 408 uses the k-means algorithm to identify clusters of corpus terms. In some embodiments, the clustering module 408 compute Euclidean distances between corpus terms to identify clusters, where the distance is indicative of relatedness or closeness to other corpus term in the assigned cluster. In some embodiments, the clustering module 408 uses a k-medoids clustering, connectivity-based clustering, centroid-based clustering, distribution-based clustering, density-based clustering, fuzzy clustering, biclustering, or any other suitable clustering model.

In the illustrated embodiment, the key aspects module 410 determines the "key aspects" that led to a certain concept being grouped into a certain cluster (e.g. the concept "eating a banana" was grouped with other concepts in a cluster "sensory experience" because eating involves the key aspect "tasting"). In some embodiments, the key aspects correspond to key features of a feature vector of a concept (i.e., corpus term). Thus, in some embodiments, key aspects are key features that most contributed to influencing the clustering algorithm when the algorithm grouped the concept in its cluster. In some embodiments, the key aspects module 410 uses a form of explainable artificial intelligence (AI), for example a contrastive explainability technique, to determine the key aspects that led to the cluster selection for each concept. In some embodiments, the contrastive explainability technique involves perturbing the features of a concept feature vector to determine the importance of each of the different features and thereby identify the reasoning behind the cluster selections for each concept.

In the illustrated embodiment, the analogy module 412 operates responsive to an input from a user. For example, in some embodiments, the analogy module 412 operates responsive to an input from the user device 418. In some embodiments, the analogy module 412 operates responsive to a query from the user, where the query identifies a specified concept related to a concept that is unfamiliar to the user or a concept about which the user is seeking additional information. In some such embodiments, a user is using the user device 418 to try to learn something and requests an analogy for a specified concept. The analogy module 412 identifies one or more analogies based on shared "key aspects" and outputs one or more of the identified analogies to the user device 418. In an embodiment, as a non-limiting example, a user familiar with music is using the user device 418 to learn about "digital signals" and requests an analogy; in response, the analogy module 412 suggests an analogy relating "staccato" music to "digital" signals because both concepts ("digital" and "staccato") share the key aspect "discrete."

In some embodiments, the analogy module 412 selects an analogy based on one or more parameters. For example, in some embodiments, the analogy module 412 selects an analogy based on parameters that include the accuracy of the analogy, the relevance to the requesting user of the analogy, and the conceptual distance of the concepts included in the analogy.

In some embodiments, the analogy module 412 calculates the accuracy of the analogy based on an amount of overlap between the "key aspects" of the different concepts in the analogy. In some such embodiments, the analogy module 412 favors concepts with higher accuracy values over concepts with lower accuracy values.

In some embodiments, relevance to the requesting user is based on feedback received in the feedback module 414 from previously provided analogies for the requesting user. For example, certain concepts may be too complex or unfamiliar for certain users. In some embodiments, the analogy module 412 favors concepts with higher relevance values over concepts with lower relevance values.

In some embodiments, the conceptual distance of the concepts included in the analogy is based on the Euclidean distance between the clusters in the semantic space used for the clustering algorithm by the clustering module 408. In some such embodiments, the analogy module 412 favors concepts with larger conceptual distances over concepts with lower conceptual distances. In some embodiments, concepts with larger conceptual distances are preferred because an analogy that involves explaining a concept with a very similar one (e.g., "digital" with "encoded") is unlikely to be as useful as an analogy that involves explaining a concept with a dissimilar concept (e.g., "digital" with "staccato"). In some such embodiments, the analogy module 412 considers the request to be for an analogy for a concept that is in the user's area of study. Therefore, the analogy module 412 considers the very similar concept to likely be related to the user's area of study, and likewise considers the very dissimilar concept to likely be related to one of the user's areas of interest. In some embodiments, the conceptual distance must be above a certain threshold between the concept associated with the analogy request and another concept selected for use in the suggested analogy.

In the illustrated embodiment, the feedback module 414 determines an effectiveness, or associated effectiveness value, based at least in part on sensor data indicative of a user action responsive to the outputting of the suggested analogy to the user. In various embodiments, the effectiveness of the analogy is determined by tracking aspects of the user's reaction to receiving the analogy, such as the length of time the user spends on the content related to the concept for which the analogy was provided, whether or not the user chooses to request another analogy for the same concept, whether or not the user highlights the analogy or shares the analogy with other users, or feedback from the user in connection with the analogy (e.g., a positive or negative response or rating of the analogy).

In some embodiments, the output from the feedback module 414 may be provided to the clustering module 408 for use as a feedback loop to allow the clustering module 408 to learn and improve analogy selection and creation over time. The feedback from the feedback module 414 may be a simple value or score for a directional analogy pair (having B as an analogy for A is not identical to having A as an analogy for B). In another implementation, reinforcement learning is leveraged to incorporate the feedback where rewards/penalties are applied based on a user's engagement with an analogy. In another implementation, the feedback is also provided to the corpus module 404 and used to enhance the generation of the corpus for a single user or for a plurality of users.

Figure 5:
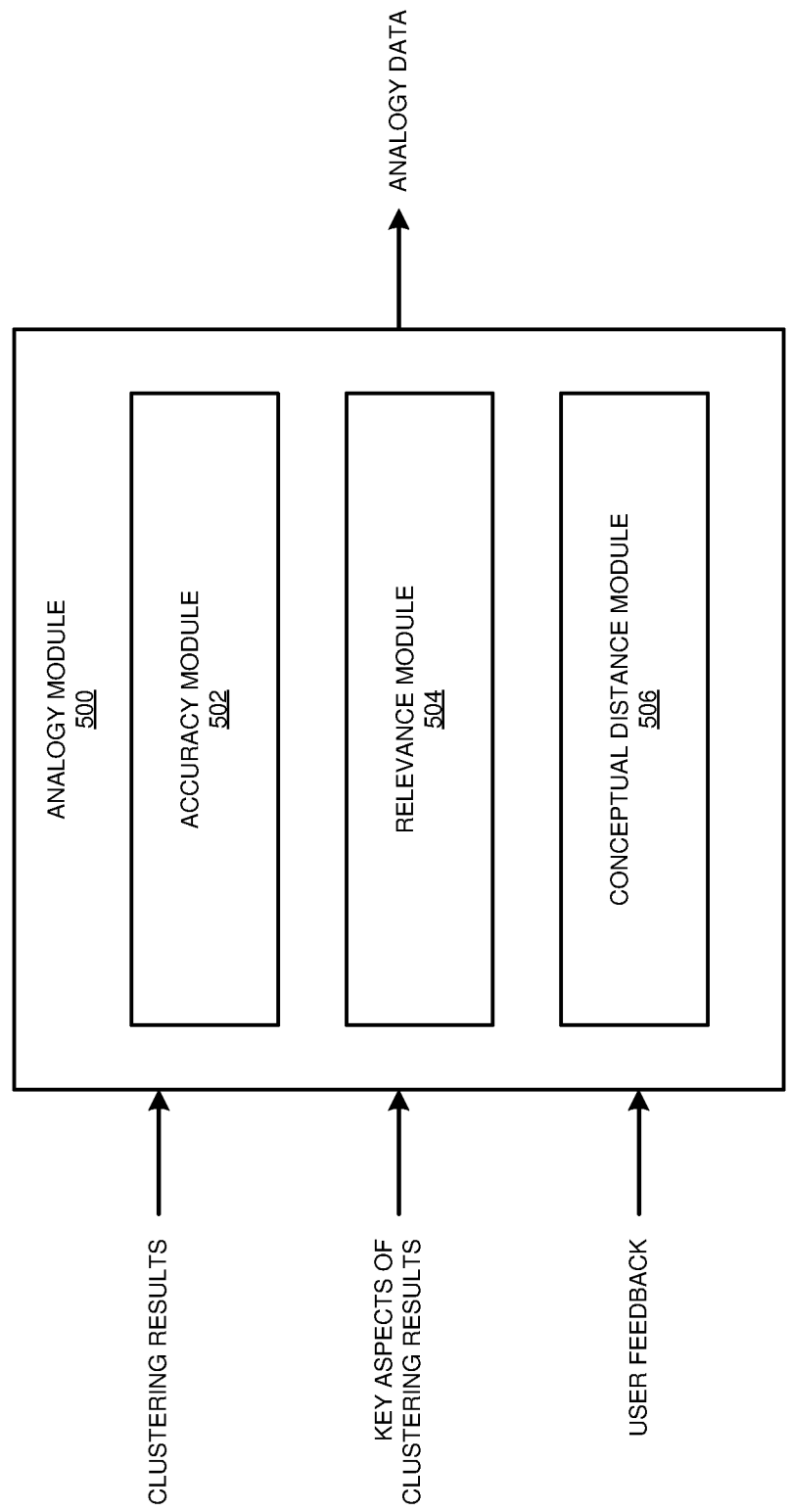
FIG. 5 depicts a block diagram of an analogy module in accordance with an illustrative embodiment.

With reference to FIG. 5, this figure depicts a block diagram of an analogy module 500 in accordance with an illustrative embodiment. In a particular embodiment, analogy module 500 is an example of analogy module 412 of FIG. 4.

In the illustrated embodiment, the analogy module 500 includes an accuracy module 502, a relevance module 504, and a conceptual distance module 506. In alternative embodiments, the analogy module 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the analogy module 500 receives clustering results (e.g., from the clustering module 408), key aspects of the clustering results (e.g., from the key aspects module 410), and user feedback (e.g., from the feedback module 414). The analogy module 500 identifies one or more analogies based on shared "key aspects" and outputs one or more of the identified analogies to the user in response to a user query for an analogy.

In some embodiments, the analogy module 500 selects an analogy based on one or more parameters. For example, in some embodiments, the analogy module 500 selects an analogy based on parameters that include the accuracy of the analogy, the relevance to the requesting user of the analogy, and the conceptual distance of the concepts included in the analogy.

In some embodiments, the accuracy module 502 calculates the accuracy of the analogy based on an amount of overlap between the "key aspects" of the different concepts in the analogy. In some such embodiments, the accuracy module 502 favors concepts with higher accuracy values over concepts with lower accuracy values.

In some embodiments, the relevance module 504 calculates relevance to the requesting user based on feedback received (e.g., from the feedback module 414) in response to previously-provided analogies to the requesting user. For example, certain concepts may be too complex or unfamiliar for certain users. In some embodiments, the relevance module 504 favors concepts with higher relevance values over concepts with lower relevance values.

In some embodiments, the conceptual distance module 506 calculates conceptual distance of the concepts included in the analogy based on the Euclidean distance between the clusters in the semantic space used for the clustering algorithm. In some such embodiments, the conceptual distance module 506 favors concepts with larger conceptual distances over concepts with lower conceptual distances. In some embodiments, concepts with larger conceptual distances are preferred because an analogy that involves explaining a concept with a very similar one (e.g., "digital" with "encoded") is unlikely to be as useful as an analogy that involves explaining a concept with a dissimilar concept (e.g., "digital" with "staccato"). In some such embodiments, the conceptual distance module 506 considers the request to be for an analogy for a concept that is in the user's area of study. Therefore, the conceptual distance module 506 considers the very similar concept to likely be related to the user's area of study, and likewise considers the very dissimilar concept to likely be related to one of the user's areas of interest. In some embodiments, the conceptual distance module 506 compares the conceptual distance to a predetermined threshold value and discards the concept if the conceptual distance is less than the threshold value. In some such embodiments, the conceptual distance module 506 requires that the conceptual distance must be above a certain threshold between the concept associated with the analogy request and another concept selected for use in the suggested analogy.

Figure 6:
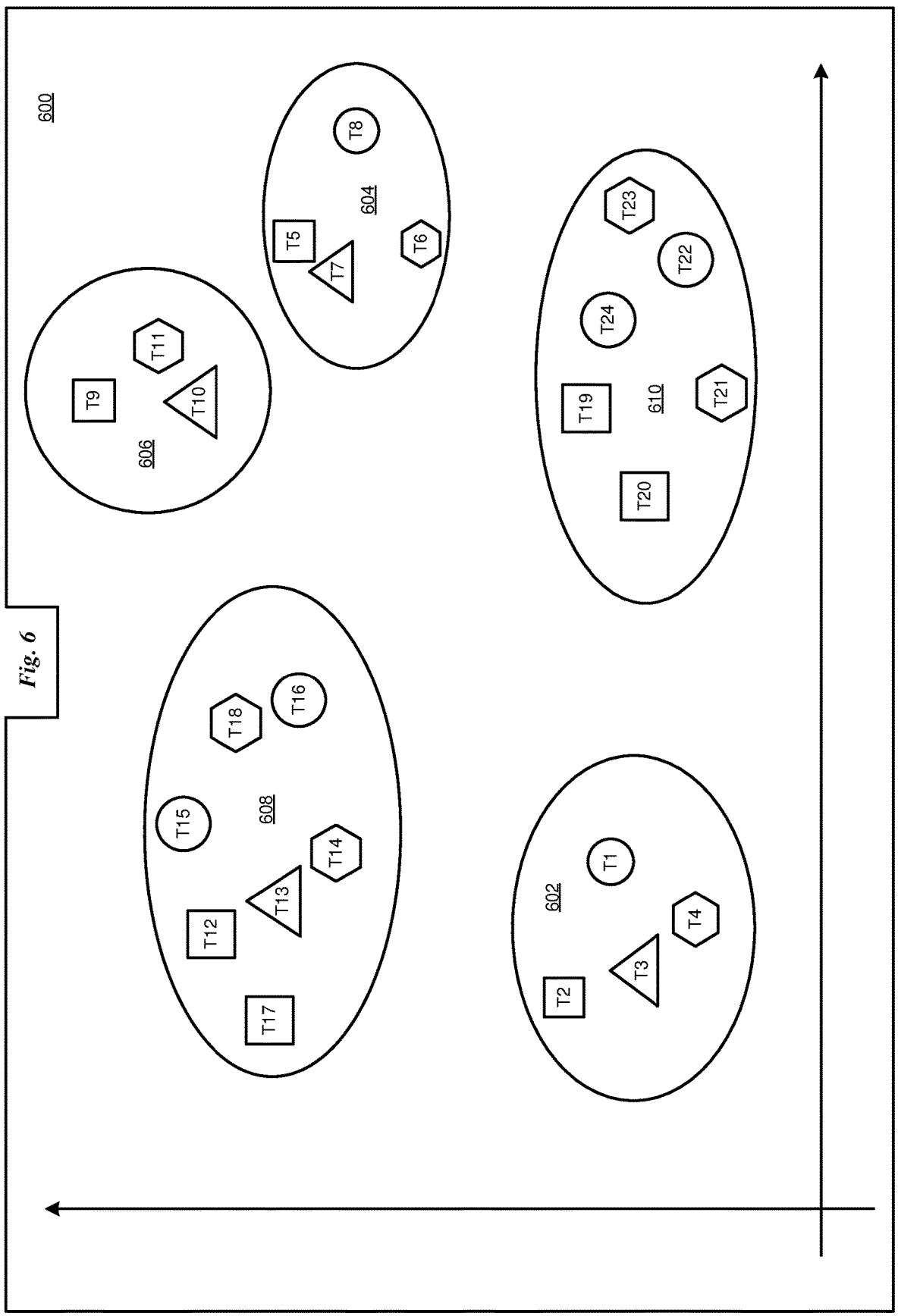
FIG. 6 depicts a block diagram of an example, non-limiting semantic space having corpus terms clustered in accordance with an illustrative embodiment.

With reference to FIG. 6, this figure depicts a block diagram of an example, non-limiting semantic space 600 having corpus terms T1-T24 clustered in accordance with an illustrative embodiment. The corpus terms T1-T24 are representative of respective concepts. In a particular embodiment, corpus terms T1-T24 are concepts from corpus 420 clustered by clustering module 408 of FIG. 4.

In this non-limiting example, terms T1-T4 are included in cluster 602, terms T5-T8 are included in cluster 604, terms T9-T11 are included in cluster 606, terms T12-T18 are included in cluster 608, and terms T19-T24 are included in cluster 610. While five clusters are depicted in the example, alternative embodiments generate any suitable number of clusters.

Figure 7:
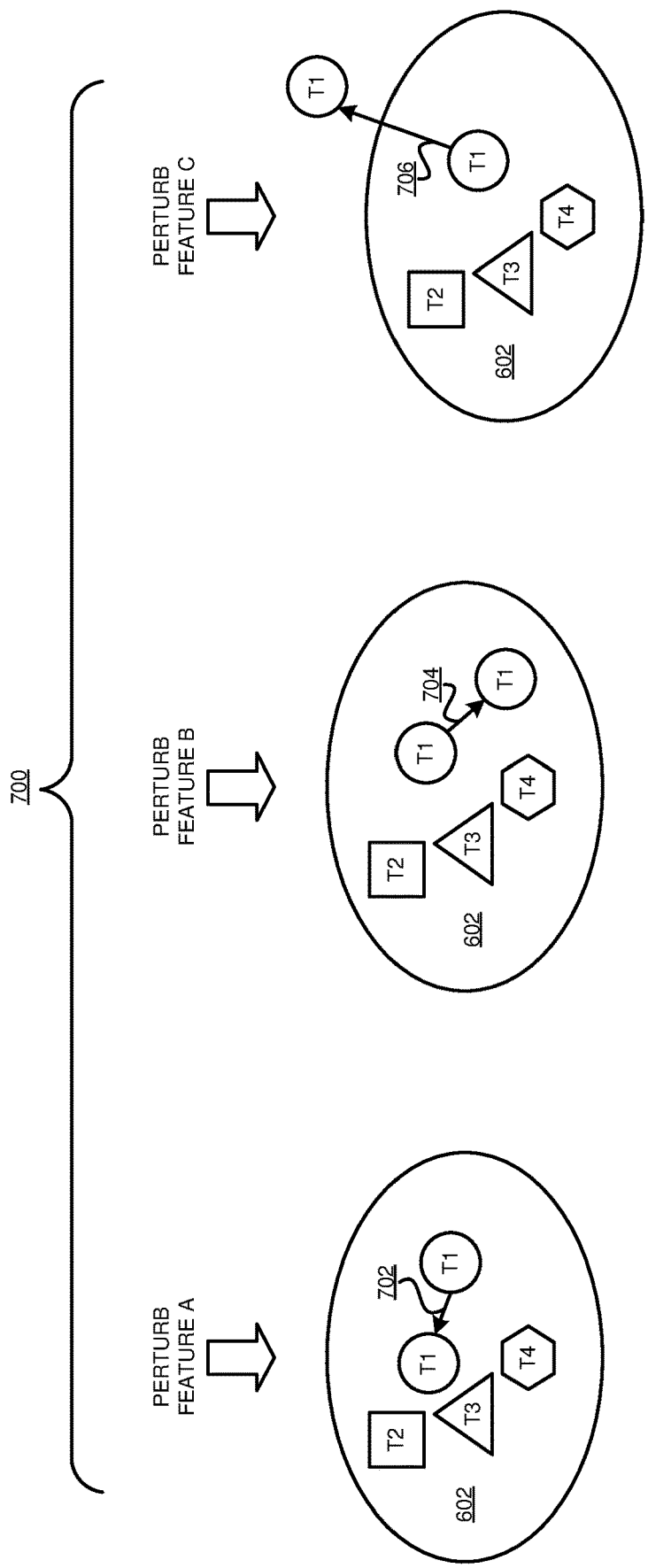
FIG. 7 depicts a block diagram of an example, non-limiting explainability technique in accordance with an illustrative embodiment.

With reference to FIG. 7, this figure depicts a block diagram of an example, non-limiting explainability technique 700 in accordance with an illustrative embodiment. The explainability technique 700 is shown being applied to the corpus term T1 of the cluster 602 of FIG. 6, but applies equally to other corpus terms, including corpus terms T2-T24 of FIG. 6. In a particular embodiment, the explainability technique 700 is performed by key aspects module 410 of FIG. 4.

In the illustrated embodiment, the key aspects module 410 determines the "key aspects" that led to corpus term T1 being grouped into the cluster 602. The corpus term T1 comprises a feature vector that includes features A, B, and C. The key aspects of corpus term T1 correspond to key features of the feature vector of corpus term T1. The explainability technique 700 determines the key aspects that most contributed to influencing the clustering algorithm when the algorithm grouped the corpus term T1 in the cluster 602 using a form of explainable artificial intelligence (AI), for example a contrastive explainability technique.

In the illustrated embodiment, the explainability technique 700 perturbs the features A, B, and C one at a time to determine the importance of each of these features. For example, in some embodiments, the explainability technique 700 perturbs feature A by removing feature A and re-processing the feature vector without feature A, which results in the corpus term T1 being moved as shown by arrow 702. The explainability technique 700 then returns feature A and perturbs feature B by removing feature B and re-processing the feature vector without feature B, which results in the corpus term T1 being moved as shown by arrow 704. The explainability technique 700 then returns feature B and perturbs feature C by removing feature C and re-processing the feature vector without feature C, which results in the corpus term T1 being moved as shown by arrow 706.

In the illustrated embodiment, the explainability technique 700 perturbs features A, B, and C in turn. As indicated by arrow 706 compared to arrows 702 and 704, feature C appears to be more important than terms A and B for causing the clustering algorithm to cluster the corpus term T1 in cluster 602 because removing feature C causes the corpus term T1 to move outside of the cluster area 602. and neither the removal of feature A or of feature B resulted in moving the corpus term T1 of these features made as big of a difference as when features and thereby identify the reasoning behind the cluster selections for each concept. Thus, in the illustrated example, the feature C would be designated as the key feature or "key aspect."

Figure 8:
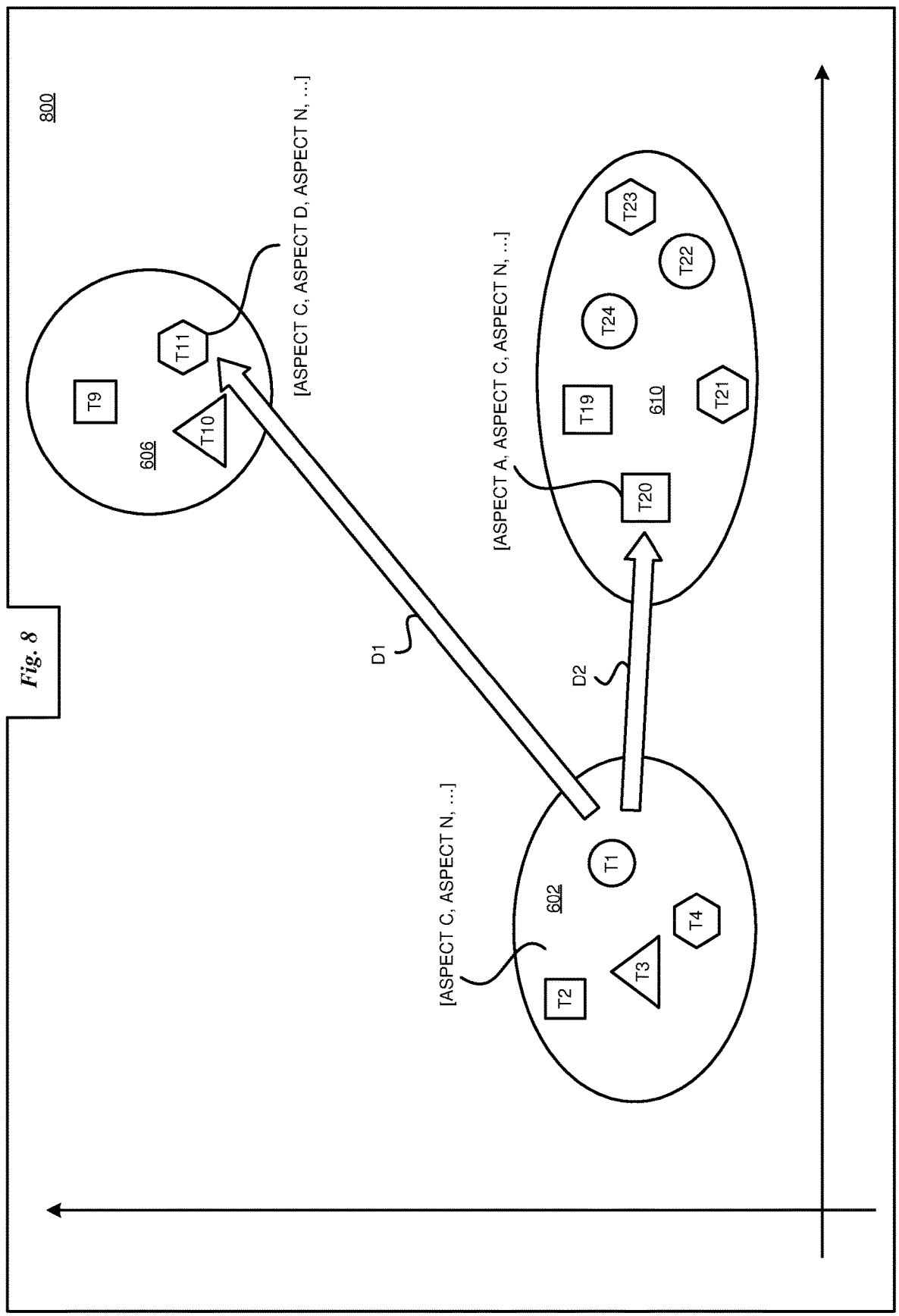
FIG. 8 depicts a block diagram of an example of a non-limiting semantic space having corpus terms clustered in accordance with an illustrative embodiment.

With reference to FIG. 8, this figure depicts a block diagram of an example, non-limiting semantic space 800 having corpus terms T1-T4, T9-T11, and T19-T24 clustered in accordance with an illustrative embodiment. The corpus terms T1-T24 are representative of respective concepts. In a particular embodiment, corpus terms T1-T24 are concepts from corpus 420 clustered by clustering module 408 of FIG. 4 into clusters 602, 606, and 610 of FIG. 6.

In the illustrated embodiment, the analogy module 412 selects an analogy in response to a user query. The analogy module 412 first selects, responsive to the query from a user, the feature vector of corpus term T1 based on a detected relevance between the concept of corpus term T1 and the query.

The analogy module 412 then searches for a second corpus term to complete the analogy by searching for feature vectors that have key features that overlap with the key features of corpus term T1. For example, in some embodiments, the first corpus term T1 is related to an area of study for the user, and the analogy module 412 is searching for a second corpus term related to a user interest. In the illustrated example, the analogy module 412 initially selects the respective feature vectors of both corpus term T11 and corpus term T20 due to feature overlap. The feature vector of corpus term T11 includes key aspect C and key aspect N that are also present in the feature vector of corpus term T1, and the feature vector of corpus term T20 also includes key aspect C and key aspect N that are present in the feature vector of corpus term T1.

In the illustrated embodiment, the analogy module 412 then continues to determine the second corpus term to complete the analogy by selecting the corpus term T11 or T20 that has the greatest degree of dissimilarity from the corpus term T1. In the illustrated embodiment, the degree of dissimilarity is determined based on a Euclidean distance between the corpus term T1 and the corpus term under consideration. As shown, the Euclidean distance between corpus term T1 and corpus term T11 is distance D1, and the Euclidean distance between corpus term T1 and corpus term T20 is distance D2. Since distance D1 is greater than distance D2, this means that the corpus term T11 has a greater degree of dissimilarity than that of corpus term T20 from corpus term T1. Thus, in this example, the corpus term T11 is selected as the second corpus term for completing the analogy.

Figure 9:
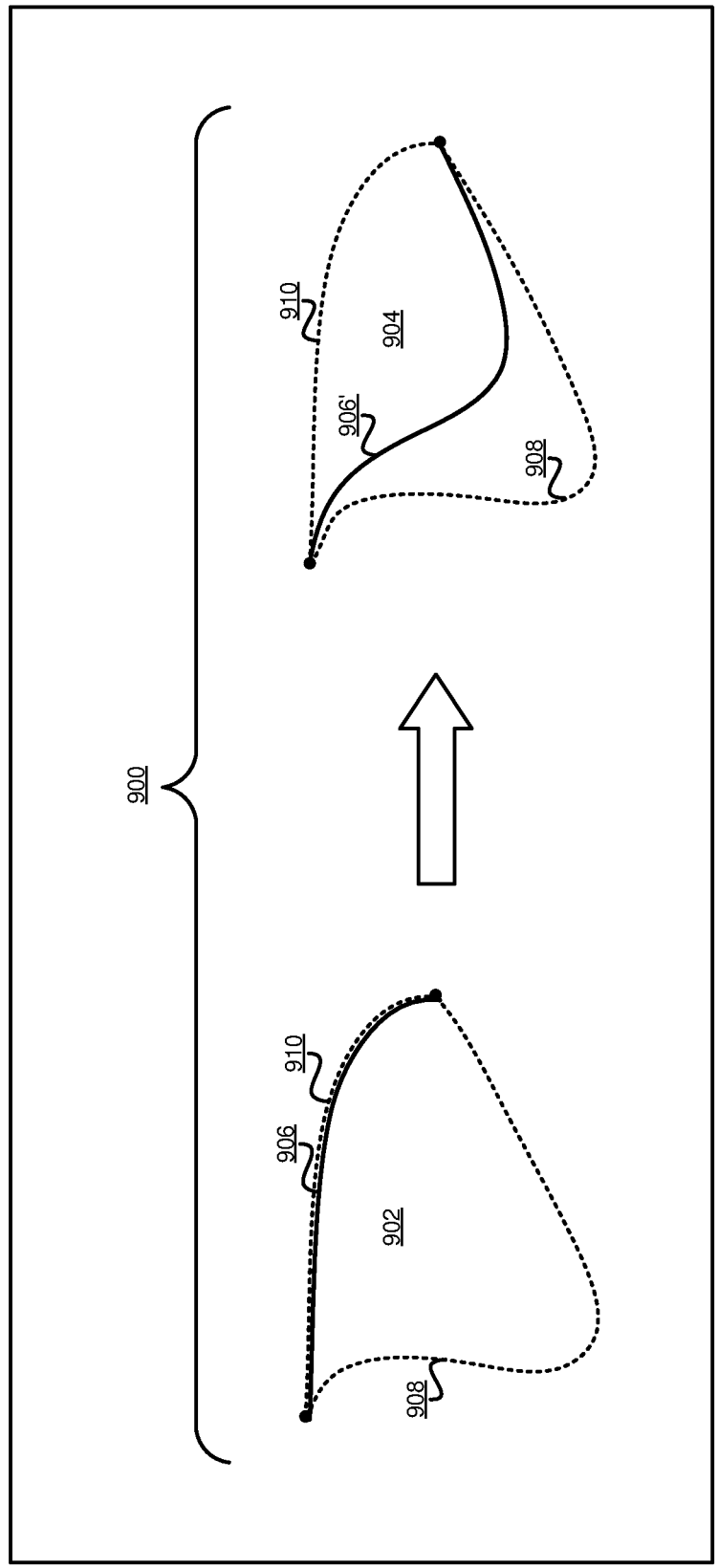
FIG. 9 depicts a schematic diagram of a morphing homotopy in accordance with an illustrative embodiment.

With reference to FIG. 9, this figure depicts a schematic diagram of a morphing homotopy 900 in accordance with an illustrative embodiment. In a particular embodiment, the morphing homotopy 900 is generated by feedback module 414 of FIG. 4.

The morphing homotopy 900 provides a visual, graphical view of how learning is progressing. The morphing homotopy 900 includes homotopy 902 and homotopy 904. Homotopies 902 and 904 both include a lower path 908 and an upper path 910, both shown in broken lines. In some embodiments, the lower and upper paths 908 and 910 represent respective knowledge-level boundaries. For example, in an embodiment, the upper path 910 represents a starting point for a user's level of knowledge at the beginning of a course of study, and the lower path 908 represents a desired or target level of knowledge that the user is seeking. Thus, upper path 910 represents a very basic or primitive level of knowledge, while the lower path 908 represents a deep level of knowledge, which is a desired or target level of knowledge that is sought. The paths 906 and 906' represent the user's actual level of knowledge. Thus, homotopy 902 illustrates the user's level of knowledge along path 906 near upper path 910 at the beginning of the new course of study, and homotopy 904 illustrates the user's level of knowledge along path 906' between the upper path 910 and the lower path 908 at some point during the new course of study.

In some embodiments, the morphing homotopy 900 may similarly be applied by the feedback module 414 (shown in FIG. 4) to evaluate the effectiveness of an analogy or compare the effectiveness of multiple analogies. For example, the homotopy 902 may be representative of an amount of knowledge gained by a user, or an average for a group of users, after being provided with a first analogy, and the homotopy 904 may be representative of an amount of knowledge gained by a user, or an average for a group of users, after being provided with a second analogy. In such embodiments, the path 910 is representative of the amount of knowledge about a topic that a user had before receiving the analogy, and the paths 906/906' are representative of amounts of knowledge that users had after receiving the first analogy (path 906) or the second analogy (path 906'). In this example, path 906' analogy is much closer to the target knowledge 908 than the path 906, so the second analogy will be considered the better analogy according to this comparison.

Figure 10:
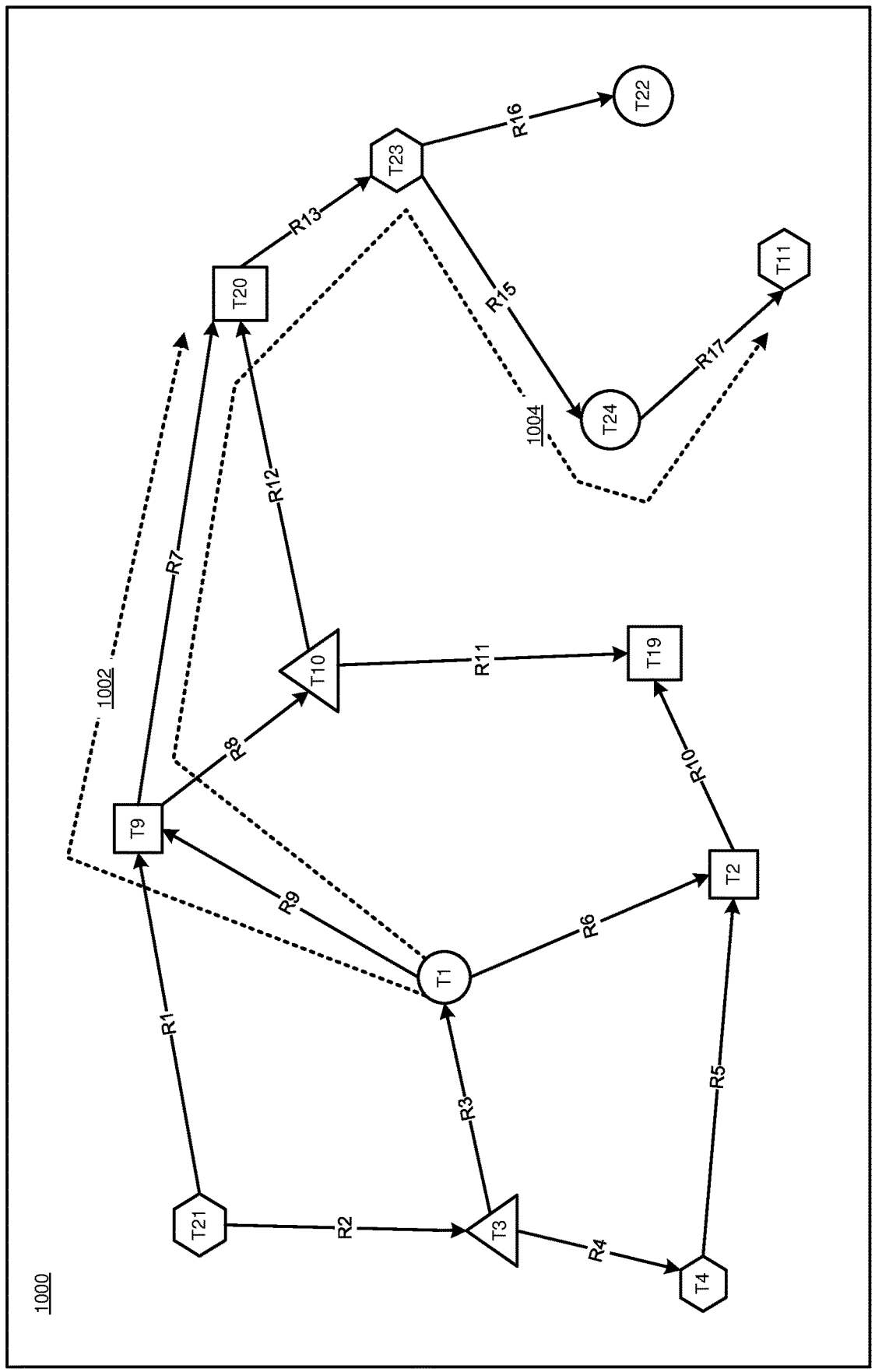
FIG. 10 depicts a knowledge graph in accordance with an illustrative embodiment.

With reference to FIG. 10, this figure depicts a knowledge graph 1000 in accordance with an illustrative embodiment. In a particular embodiment, the knowledge graph 1000 is generated by analogy module 412 of FIG. 4.

In the illustrated embodiment, the knowledge graph 1000 includes a plurality of vertices corresponding to clustered corpus terms T1-T4, T9-T11, and T19-T24 shown in FIGS. 6-8. The vertices T1-T4, T9-T11, and T19-T24 are connected by labeled edges R1-R17 that describe the relationship between two vertices in each pair of connected vertices. Edges R1-R17 may be unidirectional or bidirectional in various embodiments. In some embodiments, the knowledge graph 1000 may be used as an alternative embodiment for determining the degree of dissimilarity between corpus term T1 and corpus terms T11 and T20. As shown, the distance between corpus term T1 and corpus term T20 is measured along path 1002, whereas the distance between corpus term T1 and corpus term T11 is measured along path 1004. Thus, this alternative method of determining the degree of dissimilarity between corpus term T1 and corpus terms T11 and T20 has the same result as that described above in connection with FIG. 8. Since the distance along path 1004 is greater than the distance along path 1002, this means that the corpus term T11 has a greater degree of dissimilarity than that of corpus term T20 from corpus term T1. Thus, in this example, the corpus term T11 is selected as the second corpus term for completing the analogy.

Figure 11:
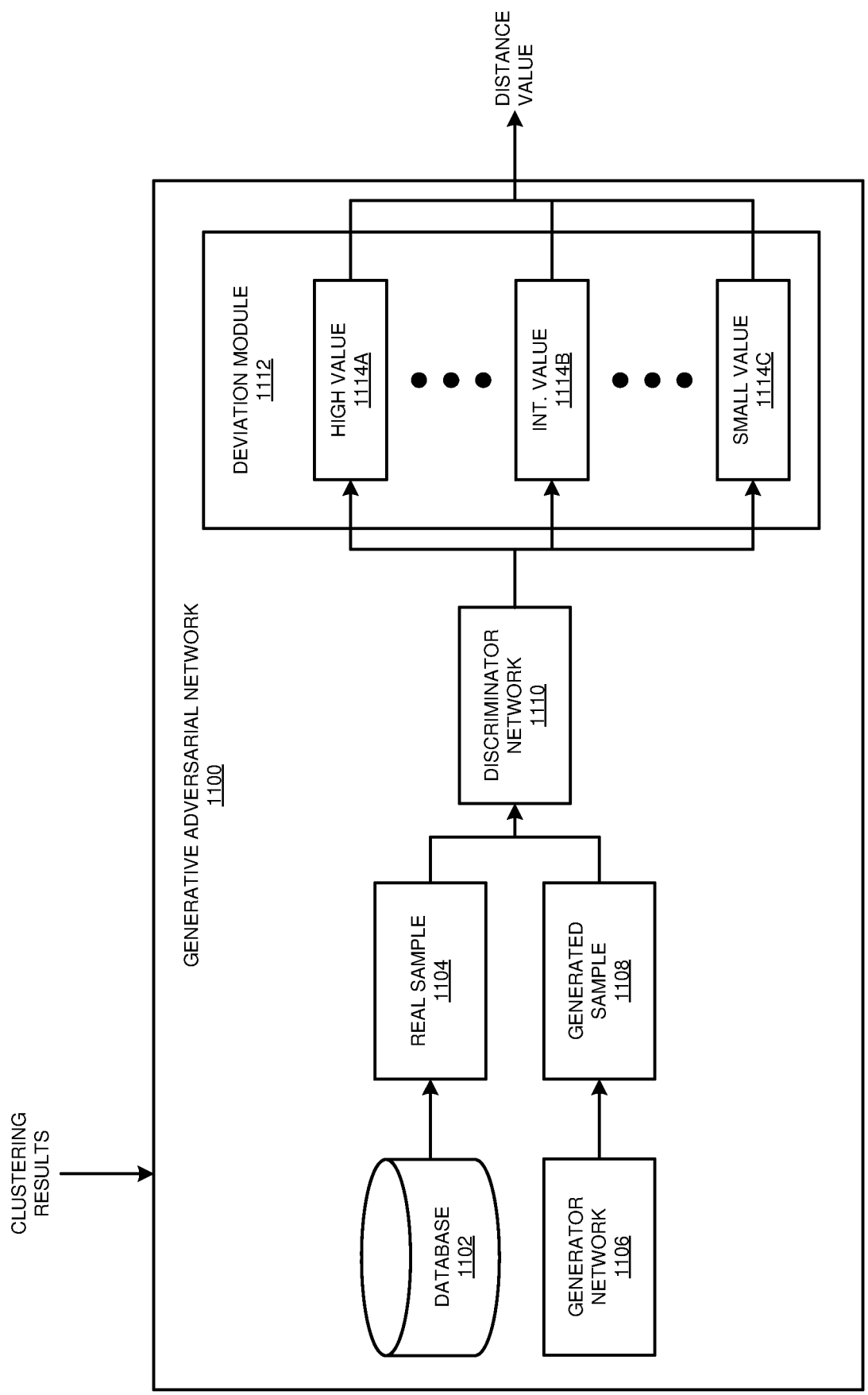
FIG. 11 depicts a block diagram of an example Generative Adversarial Network (GAN) in accordance with an illustrative embodiment.

With reference to FIG. 11, this figure depicts a block diagram of an example Generative Adversarial Network (GAN) 1100 in accordance with an illustrative embodiment. In a particular embodiment, the GAN 1100 is an embodiment of the relevance module 504 shown in FIG. 5.

In the illustrated embodiment, the GAN 1100 includes database 1102, a generator network 1106, a discriminator network 1110, and a deviation module 1112. In alternative embodiments, the GAN 1100 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

The database 1102 stores the clustering results, for example from clustering module 408 of FIG. 4, and previously used analogies that are provided as real data for a real sample 1104 to the discriminator network 1110. The generator network 1106 undergoes a training phase during which it is trained to provide generated or synthetic data as a generated sample 1108 to the discriminator network 1110. The discriminator network 1110 outputs a value to predict an effectiveness of the analogy. In the illustrated embodiment, the discriminator network 1110 predicts a value representative of an amount of deviation from a user's knowledge level prior to receiving the analogy. For example, in some embodiments, the discriminator network 1110 outputs a value representative of an amount of deviation of path 906' in a homotopy 904 as shown in FIG. 9 and described above. In some such embodiments, the amount of deviation may be, for example, an increase in distance between the path 906' and the upper path 910 in FIG. 9. Alternatively, in some such embodiments, the amount of deviation may be an increase in an area defined between the path 906' and upper path 910 in FIG. 9. The deviation module 1112 detects the amount of deviation and quantifies the amount into a value that will be meaningful as feedback for evaluating the effectiveness of an analogy. For example, the deviation module 1112 may classify the amount of deviation as a high value 1114A, an intermediate value 1114B, or a small value 1114C, and output a value representative of the detected deviation classification. While three classifications 1114A-1114C are shown, alternative embodiments may include additional or fewer classification levels.

Figure 12:
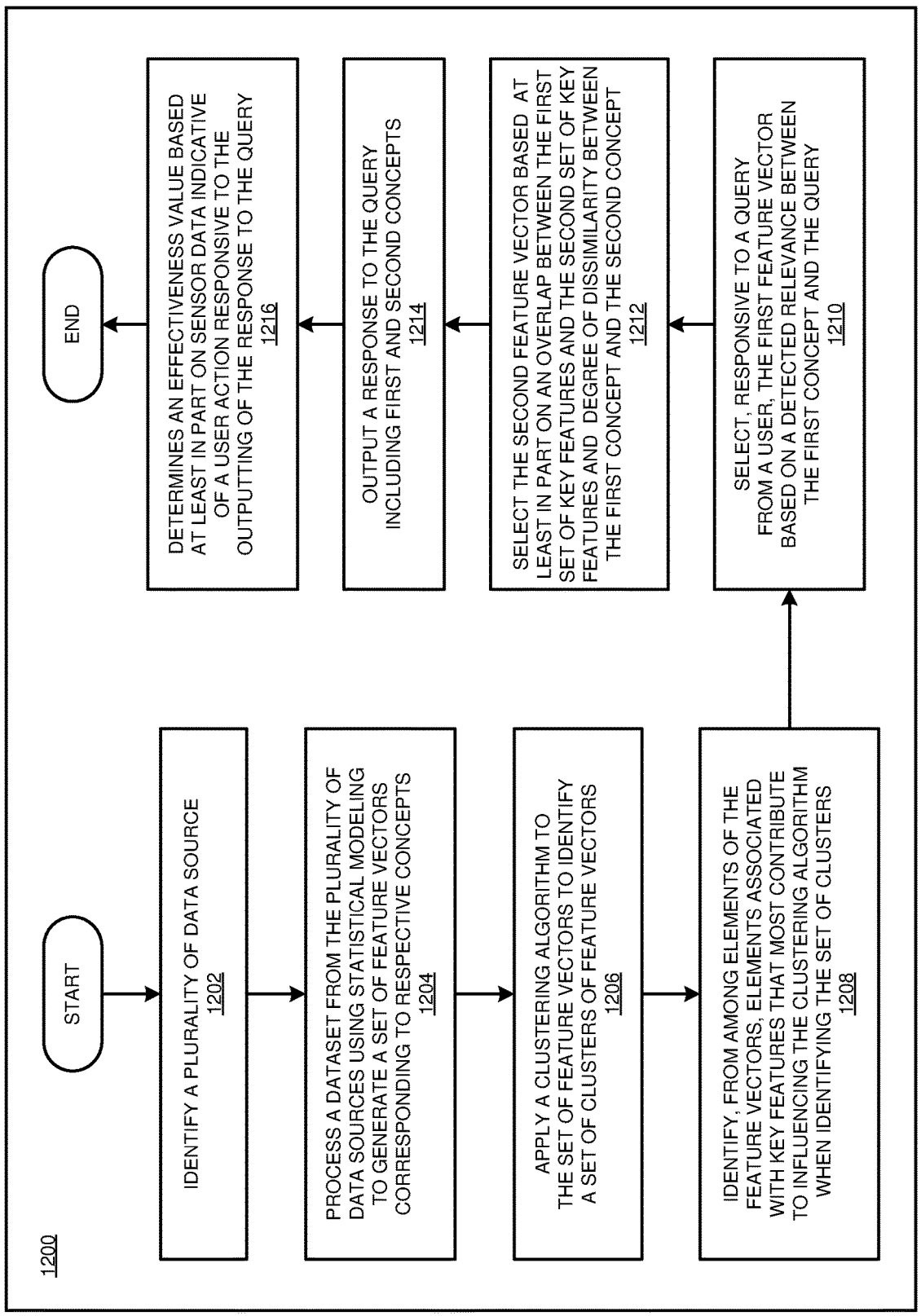
FIG. 12 depicts a flowchart of an example process for cognitive generation of tailored analogies in accordance with an illustrative embodiment.

With reference to FIG. 12, this figure depicts a flowchart of an example process 1200 for cognitive generation of tailored analogies in accordance with an illustrative embodiment. In a particular embodiment, the analogy recommendation system 402 carries out the process 1200.

In an embodiment, at block 1202, the process identifies a plurality of data sources. In some embodiments, the plurality of data sources include accessible data related to a plurality of topics. In some embodiments, the plurality of topics include a first topic selected based on a user interest and a second topic selected based on an area of study for the user. Next, at block 1204, the process processes a dataset from the plurality of data sources using statistical modeling to generate a set of feature vectors corresponding to respective concepts. In some embodiments, the set of feature vectors includes a first feature vector corresponding to a first concept and a second feature vector corresponding to a second concept.

Next, at block 1206, the process applies a clustering algorithm to the set of feature vectors to identify a set of clusters of feature vectors. In some embodiments, the set of clusters includes a first cluster of feature vectors and a second cluster of feature vectors, where the first cluster of feature vectors includes the first feature vector and the second cluster of feature vectors includes the second feature vector. Next, at block 1208, the process identifies, from among elements of the feature vectors, elements associated with key features that most contribute to influencing the clustering algorithm when identifying the set of clusters. In some embodiments, the key features include a first set of key features from the first feature vector and a second set of key features from the second feature vector.

Next, at block 1210, the process selects, responsive to a query from a user, the first feature vector based on a detected relevance between the first concept and the query. Next, at block 1212, the process selects the second feature vector based at least in part on an overlap between the first set of key features and the second set of key features and a degree of dissimilarity between the first concept and the second concept. Next, at block 1214, the process outputs a response to the query. In some embodiments, the response includes the first and second concepts. Finally, at block 1216, the process determines an effectiveness value based at least in part on sensor data indicative of a user action responsive to the outputting of the response to the query.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   identifying a plurality of data sources, wherein the plurality of data sources include accessible data related to a plurality of topics, wherein the plurality of topics include a first topic selected based on a user interest, and wherein the plurality of topics include a second topic selected based on an area of study for the user;
   processing a dataset from the plurality of data sources using statistical modeling to generate a set of feature vectors by converting terms in the dataset into respective feature vectors corresponding to respective concepts, the set of feature vectors including a first feature vector converted from a first term corresponding to a first concept within the first topic and a second feature vector converted from a second term corresponding to a second concept within the second topic;
   applying a clustering algorithm to the set of feature vectors to identify a set of clusters of feature vectors, wherein the set of clusters includes a first cluster of feature vectors and a second cluster of feature vectors, wherein the first cluster of feature vectors includes the first feature vector and the second cluster of feature vectors includes the second feature vector;
   identifying, from among elements of the feature vectors, elements associated with key features that most contribute to influencing the clustering algorithm when identifying the set of clusters, wherein the key features include a first set of key features from the first feature vector and a second set of key features from the second feature vector;

selecting, responsive to a query from a user, the first feature vector based on a detected relevance between the first concept and the query;
selecting the second feature vector based at least in part on an overlap between the first set of key features and the second set of key features and a degree of dissimilarity between the first concept and the second concept;
outputting a first response to the query, wherein the response includes a first analogy relating the first term to the second term;
outputting a second response to the query, wherein the second response includes a second analogy relating the first term to the second term; and
determining a relative effectiveness value between the first analogy and the second analogy, wherein the relative effectiveness value is based at least in part on a comparison between the user's level of knowledge after the first analogy and the user's level of knowledge after the second analogy.

2. The method of claim 1, wherein the dataset includes an image, and
wherein the processing of the dataset comprises performing an image-tagging process on the image resulting in identification of an image tag that is descriptive of an aspect of the image.

3. The method of claim 2, wherein the image-tagging process comprises processing the image using a convolutional neural network.

4. The method of claim 1, wherein the dataset includes audio data, and
wherein the processing of the dataset comprises performing a speech-to-text process on the audio data resulting in generation of a text transcript of the audio data.

5. The method of claim 1, wherein the processing of the dataset comprises processing text from the dataset using a topic model resulting in identification of the first concept and the second concept from the dataset.

6. The method of claim 1, wherein the clustering algorithm comprises a K-means clustering algorithm.

7. The method of claim 1, wherein the identifying of the elements associated with key features comprises detecting the first set of key features by perturbing elements of the first feature vector and detecting the second set of key features by perturbing elements of the second feature vector.

8. The method of claim 1, wherein the applying of the clustering algorithm comprises identifying the set of clusters based on Euclidean distances between the feature vectors in a semantic space.

9. The method of claim 8, further comprising:
calculating a degree of dissimilarity between the first concept and the second concept based on a Euclidean distance between the first feature vector and the second feature vector.

10. The method of claim 1, wherein the overlap between the first set of key features and the second set of key features comprises a first element of the first set of key features that is synonymous with a second element of the second set of key features.

11. The method of claim 1, wherein the output comprises a phrase that includes the first concept and the second concept.

12. The method of claim 1, further comprising determining an individual effectiveness value, wherein the determining of the individual effectiveness value comprises comparing a first amount of knowledge to a second amount of knowledge, wherein the first amount of knowledge is from before the outputting of the response to the query, and wherein the second amount of knowledge is from after the outputting of the response to the query.

13. The method of claim 12, wherein the relative effectiveness value and the individual effectiveness value are indicative of a quality of the analogy, wherein the method further comprises:
using at least one of the relative effectiveness value or the individual effectiveness value as a criterion for selecting the analogy as a response to another query from the user or from another user.

14. A computer program product comprising one or more computer readable storage media, and program instructions collectively stored on the one or more computer readable storage media, the program instructions executable by a processor to cause the processor to perform operations comprising:
identifying a plurality of data sources, wherein the plurality of data sources include accessible data related to a plurality of topics, wherein the plurality of topics include a first topic selected based on a user interest, and wherein the plurality of topics include a second topic selected based on an area of study for the user;
processing a dataset from the plurality of data sources using statistical modeling to generate a set of feature vectors by converting terms in the dataset into respective feature vectors corresponding to respective concepts, the set of feature vectors including a first feature vector converted from a first term corresponding to a first concept within the first topic and a second feature vector converted from a second term corresponding to a second concept within the second topic;
applying a clustering algorithm to the set of feature vectors to identify a set of clusters of feature vectors, wherein the set of clusters includes a first cluster of feature vectors and a second cluster of feature vectors, wherein the first cluster of feature vectors includes the first feature vector and the second cluster of feature vectors includes the second feature vector;
identifying, from among elements of the feature vectors, elements associated with key features that most contribute to influencing the clustering algorithm when identifying the set of clusters, wherein the key features include a first set of key features from the first feature vector and a second set of key features from the second feature vector;
selecting, responsive to a query from a user, the first feature vector based on a detected relevance between the first concept and the query;
selecting the second feature vector based at least in part on an overlap between the first set of key features and the second set of key features and a degree of dissimilarity between the first concept and the second concept;
outputting a first response to the query, wherein the first response includes a first analogy relating the first term to the second term;
outputting a second response to the query, wherein the second response includes a second analogy relating the first term to the second term;
determining a relative effectiveness value between the first analogy and the second analogy, wherein the relative effectiveness value is based at least in part on a comparison between the user's level of knowledge after the first analogy and the user's level of knowledge after the second analogy.

15. The computer program product of claim 14, wherein the stored program instructions are stored in a computer readable storage device in a data processing system, and wherein the stored program instructions are transferred over a network from a remote data processing system.

16. The computer program product of claim 14, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
   program instructions to meter use of the program instructions associated with the request; and
   program instructions to generate an invoice based on the metered use.

17. The computer program product of claim 14, wherein the output comprises a phrase that includes the first concept and the second concept.

18. A computer system comprising a processor and one or more computer readable storage media, and program instructions collectively stored on the one or more computer readable storage media, the program instructions executable by the processor to cause the processor to perform operations comprising:
   identifying a plurality of data sources, wherein the plurality of data sources include accessible data related to a plurality of topics, wherein the plurality of topics include a first topic selected based on a user interest, and wherein the plurality of topics include a second topic selected based on an area of study for the user;
   processing a dataset from the plurality of data sources using statistical modeling to generate a set of feature vectors by converting terms in the dataset into respective feature vectors corresponding to respective concepts, the set of feature vectors including a first feature vector converted from a first term corresponding to a first concept within the first topic and a second feature vector converted from a second term corresponding to a second concept within the second topic;
   applying a clustering algorithm to the set of feature vectors to identify a set of clusters of feature vectors, wherein the set of clusters includes a first cluster of feature vectors and a second cluster of feature vectors, wherein the first cluster of feature vectors includes the first feature vector and the second cluster of feature vectors includes the second feature vector;
   identifying, from among elements of the feature vectors, elements associated with key features that most contribute to influencing the clustering algorithm when identifying the set of clusters, wherein the key features include a first set of key features from the first feature vector and a second set of key features from the second feature vector;
   selecting, responsive to a query from a user, the first feature vector based on a detected relevance between the first concept and the query;
   selecting the second feature vector based at least in part on an overlap between the first set of key features and the second set of key features and a degree of dissimilarity between the first concept and the second concept;
   outputting a first response to the query, wherein the first response includes first analogy relating the first term to the second term;
   outputting a second response to the query, wherein the second response includes a second analogy relating the first term to the second term;
   determining a relative effectiveness value between the first analogy and the second analogy, wherein the relative effectiveness value is based at least in part on a comparison between the user's level of knowledge after the first analogy and the user's level of knowledge after the second analogy.

19. The computer system of claim 18, wherein the output comprises a phrase that includes the first concept and the second concept.

20. The computer system of claim 18, further comprising determining an individual effectiveness value, wherein the determining of the individual effectiveness value comprises comparing a first amount of knowledge to a second amount of knowledge, wherein the first amount of knowledge is from before the outputting of the response to the query, and wherein the second amount of knowledge is from after the outputting of the response to the query, and using at least one of the relative effectiveness value or the individual effectiveness value as a criterion for selecting the analogy as a response to another query from the user or from another user.

* * * * *